United States Patent Office 3,705,145
Patented Dec. 5, 1972

3,705,145
DISAZO DYESTUFFS
Alois Gottschlich and Klaus Leverenz, Leverkusen, Germany, assignors to Farbenfabriken Bayer Aktiengesellschaft, Leverkusen, Germany
No Drawing. Filed Nov. 19, 1970, Ser. No. 91,158
Claims priority, application Germany, Nov. 28, 1969,
P 19 59 774.1
Int. Cl. C09b 31/04
U.S. Cl. 260—152                14 Claims

ABSTRACT OF THE DISCLOSURE

Disazo dyestuffs of formula

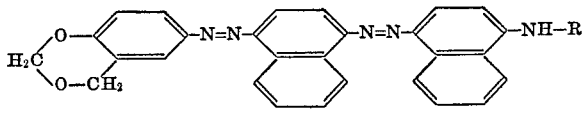

in which R denotes alkyl groups, which can be substituted by alkoxy radicals, alkoxycarbonyl radicals, nitrile, hydroxyl or halogen, as well as their preparation and their use for dyeing hydrophobic fibre materials.

The subject of the present invention are new valuable disazo dyestuffs, free of sulphonic acid groups and carboxylic acid groups, of formula

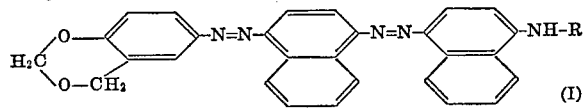
(I)

in which R represents an optionally substituted alkyl radical, as well as their manufacture and use.

Suitable radicals R are especially alkyl groups with 1 to 4 C atoms which can be substituted by alkoxy radicals with 1 to 4 C atoms, alkoxycarbonyl radicals with 2 to 5 C atoms, nitrile, hydroxyl or halogen, such as fluorine, chlorine and bromine.

The new dyestuffs of Formula I are obtained if the aminoazo dyestuff of formula

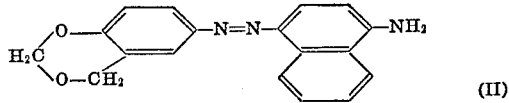
(II)

is diazotised and coupled with naphthylamines of formula

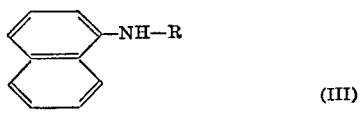
(III)

in which R has the abovementioned significance. Coupling here preferably takes place in the 4-position of the naphthalene ring of the coupling component III.

The diazo component II is known and can be manufactured by coupling diazotised 6-amino-1,3-benzodioxane with 1-aminonaphthalene.

Possible coupling components III for the manufacture of the new dyestuffs according to the invention are for example the following 1-alkylaminonaphthalenes:

1-N-methylaminonaphthalene,
1-N-1-ethylamino-naphthalene,
1-N-(β-hydroxyethylamino)-naphthalene,
1-N-(β-hydroxypropylamino)-naphthalene,
1-N-(β-hydroxybutylamino)-naphthalene,
1-N-(β-hydroxy-γ-chloropropylamino)-naphthalene,
1-N-(β-hydroxy-γ-methoxy-propylamino)-naphthalene,
1-N-(β-methoxycarbonylethylamino)-naphthalene, and
1-N-(β-cyanethylamino)-naphthalene The diazotisation of II can be carried out in a manner which is in itself known, with the addition of dispersing agents and/or polar organic solvents, such as ethylene glycol, ethylene glycol monoalkyl ethers, formamide or dimethylformamide, in dilute hydrochloric acid or sulphuric acid by means of sodium nitrite solution, or in concentrated sulphuric acid, 85% strength o-phosphoric acid, acetic acid, propionic acid or mixtures of these acids using nitrosylsulphuric acid.

The coupling components can be employed in the form of their solutions in dilute mineral acids, such as dilute hydrochloric acid or dilute sulphuric acid, or in organic solvents, such as methanol, ethanol, isopropanol, ethylene glycol, ethylene glycol monomethyl ether, ethylene glycol monoethyl ether, diethylene glycol, formamide, dimethylformamide, pyridine or acetic acid.

Diazotisation and coupling are preferably carried out in the temperature range of 0 to 40° C.

After completion of the coupling, the disazo dyestuffs of Formula I are isolated by filtering off, and are washed with water and dried.

The dyestuffs of Formula I obtainable in accordance with the invention are in particular suitable for use, in a finely divided form, for the dyeing of hydrophobic fibre materials of aromatic polyesters, cellulose acetates, polyolefines, polyurethanes, polyacrylonitrile or copolymers of acrylonitrile. These dyestuffs show very good absorption especially on structures of linear polyamides, for example polycaprolactam, polyhexamethylenediamine adipate or poly-ε-aminoundecane-acid. The violet to blue dyeings are distinguished by good light fastness and fastness to wet processing.

Compared to the dyestuffs known from German patent specification 1,243,803, the dyestuffs according to the invention show some improved dyeing properties. Thus, for example, the dyestuff of formula

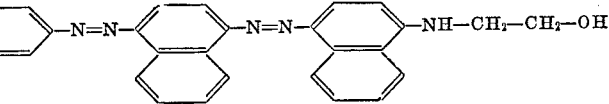

obtainable according to the invention is distinguished by better fastness to wet processing on polyamides, compared to the dyestuff of formula

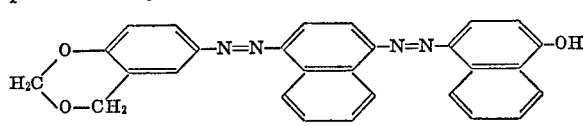

known from the abovementioned German patent specification.

In the example which follows, the temperatures quoted are degrees centigrade. The parts mentioned are, unless otherwise stated, parts by weight, and the relationship of parts by volume to parts by weight is as of the litre to the kilogram under normal conditions.

EXAMPLE 116 parts of 6-amino-1,3-benzodioxane (manufacture: An. Soc. españ. 26, 420 (1928)) are stirred with 1000 parts by volume of water, with the addition of 212 parts by volume of 30% strength hydrochloric acid, and cooled to 10° by the addition of 200 parts of ice. 177 parts by volume of 30% strength sodium nitrite solution are slowly added at 10–15° and the mixture is subsequently stirred for one hour at this temperature.

103 parts of 1-amino-naphthalene are dissolved in 2,300 parts by volume of water and 100 parts by volume of 30% strength hydrochloric acid at 80° and reprecipitated in a fine form by adding 1000 parts of ice and 610 parts by volume of 20% strength sodium acetate solution. The diazotised product, neutralised with 350 parts by volume of 20% strength sodium acetate solution, is added, with stirring, to the resulting suspension at 0–5°. After completion of the coupling, 120 parts by volume of 30% strength hydrochloric acid are added, and the precipitate is filtered off and washed with water.

The paste of the monoazo dyestuff of Formula II, thus obtained, is stirred with 1,500 parts by volume of ethylene glycol monoethyl ether with the addition of 200 parts by volume of 30% strength hydrochloric acid. 180 ml. of 30% strength sodium nitrite solution are added at 10 to 20°. After three hours' stirring at approx. 15° the diazotisation is complete.

161.5 parts of 1-N-(β-hydroxyethylamino)-naphthalene hydrocholride are stirred with 1,500 parts by volume of ethylene glycol monoethyl ether and the diazotised product is added at a temperature of 10–20°, whilst stirring. The coupling is complete after a short time. The resulting disazo dyestuff of formula

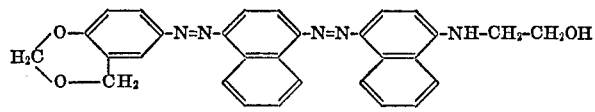

is filtered off and thoroughly washed with water. The dried product represents a dark powder which dyes polycaprolactam in blue-violet shades having very good light fastness.

If, in this example, the 1-N-(β-hydroxyethylamino)-naphthalene is replaced by the coupling components quoted in the table below, dyestuffs with similar properties are obtained, which dye polyamides in the indicated shades.

| Coupling component | Colour shade |
|---|---|
| ⌬⌬—NH—CH₂—CH—CH₃<br>             OH | Blue-violet. |
| ⌬⌬—NH—CH₂—CH—CH₂—CH₃<br>             OH | Do. |
| ⌬⌬—NH—CH₂—CH—CH₂—Cl<br>             OH | Do. |
| ⌬⌬—NH—CH₂—CH—CH₂—O—CH₃<br>             OH | Do. |
| ⌬⌬—NH—CH₂—CH₂—C—O—CH₃<br>                       ‖<br>                       O | Violet. |
| ⌬⌬—NH—CH₂—CH₂—C—O—CH₂—CH₂—OCH₃<br>                       ‖<br>                       O | Do. |
| ⌬⌬—NH—CH₂—CH₂—O—CH₂—CH₂—OH | Blue-violet. |
| ⌬⌬—NH—CH₂—CH₃ | Do. |
| ⌬⌬—NH—CH₂—CH₂—CH₂—CH₃ | Do. |
| ⌬⌬—NH—CH₂—CH₂—CN | Violet. |
| ⌬⌬—NH—CH₂—CH—CH₂—CN<br>             OH | Do. |
| ⌬⌬—NH—CH₂—CH—CF₃<br>             OH | Do. |

We claim:
1. Disazo dyestuff of the formula

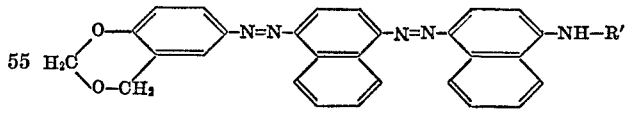

in which R' is alkyl of 1 to 4 carbon atoms; or alkyl of 1 to 4 carbon atoms substituted by alkoxy with 1 to 4 carbon atoms, alkoxycarbonyl of 2 to 5 carbon atoms, nitrile, hydroxyl or halogen.

2.

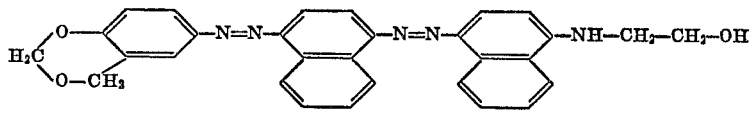

3.

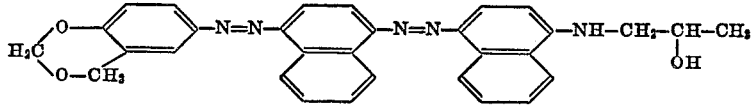

4. 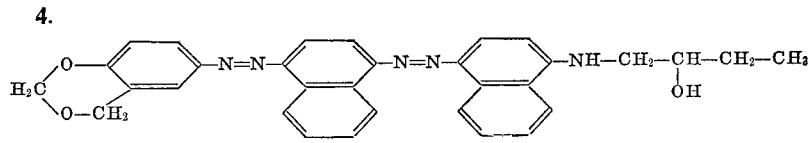
5. 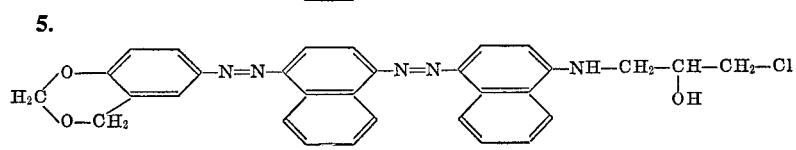
6. 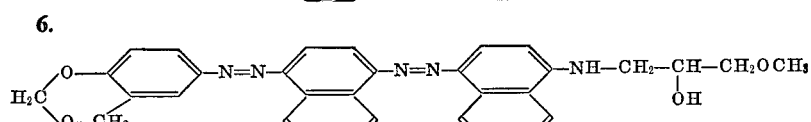
7. 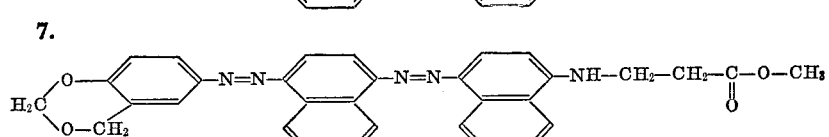
8. 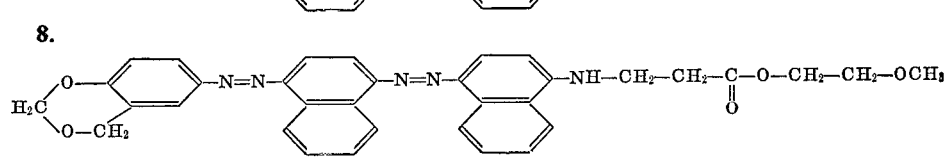
9. 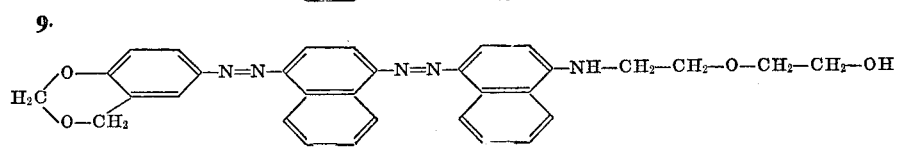
10. 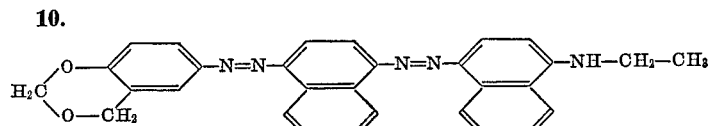
11. 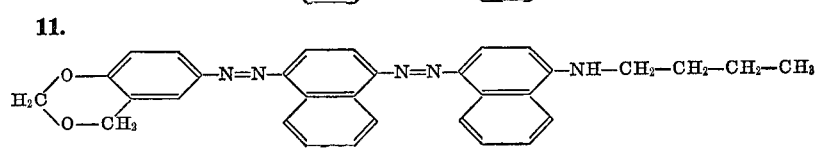
12. 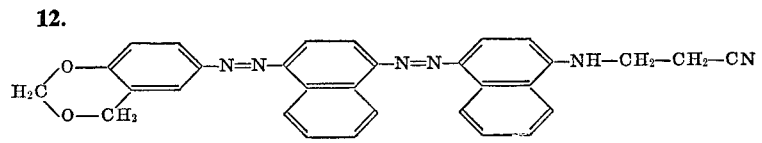
13. 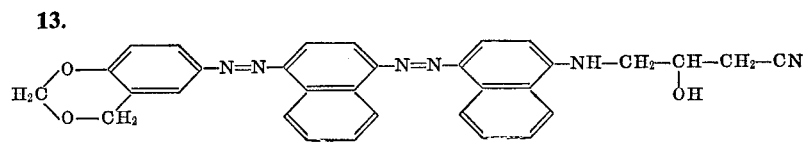
14. 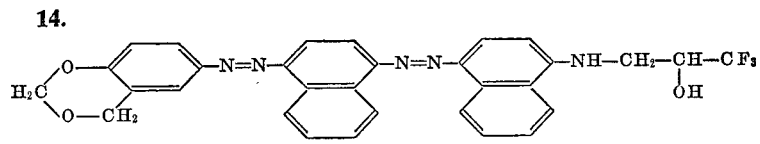
References Cited
UNITED STATES PATENTS
3,376,280   4/1968   Gottschlich et al. ____ 260—152
LEWIS GOTTS, Primary Examiner
D. M. PAPUGA, Assistant Examiner
U.S. Cl. X.R.
260—465 E, 471 A, 573, 578